US012487912B2

(12) United States Patent
Van Der Vleuten

(10) Patent No.: US 12,487,912 B2
(45) Date of Patent: Dec. 2, 2025

(54) BOOTSTRAPPING PROGRAM SYNTHESIS LANGUAGE MODELS TO PERFORM REPAIRING

(71) Applicant: QUALCOMM Technologies, Inc, San Diego, CA (US)

(72) Inventor: Noah Van Der Vleuten, Netherlands (NL)

(73) Assignee: QUALCOMM Technologies, Inc., San Diego, CA (US)

( * ) Notice: Subject to any disclaimer, the term of this patent is extended or adjusted under 35 U.S.C. 154(b) by 201 days.

(21) Appl. No.: 18/455,992

(22) Filed: Aug. 25, 2023

(65) Prior Publication Data

US 2025/0068547 A1   Feb. 27, 2025

(51) Int. Cl.
   *G06F 11/3668*   (2025.01)

(52) U.S. Cl.
   CPC ...... *G06F 11/3688* (2013.01); *G06F 11/3692* (2013.01)

(58) Field of Classification Search
   CPC ............ G06F 11/3688; G06F 11/3692
   USPC ............... 717/124–151; 706/21–45
   See application file for complete search history.

(56) References Cited

U.S. PATENT DOCUMENTS

| | | | | |
|---|---|---|---|---|
| 9,956,961 B2* | 5/2018 | Ishikawa | ............... | B60W 30/12 |
| 10,705,810 B2* | 7/2020 | Fuchs | ................. | G06F 11/3692 |
| 11,249,891 B1* | 2/2022 | Patel-Schneider | ........................... | G06F 11/3684 |
| 11,354,599 B1* | 6/2022 | Hübl | ........................ | G06N 5/02 |
| 11,537,502 B1* | 12/2022 | Rohithakshappa | ........................... | G06F 11/3688 |
| 11,635,949 B2* | 4/2023 | Gottschlich | ......... | G06F 11/3608 717/143 |
| 11,775,850 B2* | 10/2023 | Campos | ................. | G06N 5/043 706/25 |
| 11,899,566 B1* | 2/2024 | Singh | ................... | G06F 11/3684 |
| 12,282,411 B2* | 4/2025 | Zhang | ....................... | G06F 8/42 |
| 2024/0020116 A1* | 1/2024 | Chen | ........................ | G06N 3/08 |

OTHER PUBLICATIONS

Tan et al, "RoleML: a Role-Oriented Programming Model for Customizable Distributed Machine Learning on Edges", ACM, pp. 1-13 (Year: 2024).*
Liu et al, "Multi-task Learning based Pre-trained Language Model for Code Completion", ACM, pp. 1-13 (Year: 2020).*
Ellis et al, "DreamCoder: Bootstrapping Inductive Program Synthesis withWake-Sleep Library Learning", ACM, pp. 1-16 (Year: 2021).*

(Continued)

*Primary Examiner* — Anil Khatri
(74) *Attorney, Agent, or Firm* — Patterson & Sheridan LLP

(57) ABSTRACT

Certain aspects of the present disclosure provide techniques and apparatus for improved program synthesis using machine learning. An input indicating a programming task is accessed. A generated program is generated based on processing the input using a trained machine learning model. In response to determining that the generated program failed to satisfy the programming task, feedback is generated, and a revised program is generated based on processing the feedback using the trained machine learning model. In response to determining that the revised program satisfied the programming task, one or more parameters of the trained machine learning model are updated based on the revised program.

30 Claims, 6 Drawing Sheets

(56) References Cited

OTHER PUBLICATIONS

David et al, "Program Synthesis for Program Analysis", ACM, pp. 1-45 (Year: 2018).*
Leuper et al, "Retargetable Assembly Code Generation by Bootstrapping", IEEE, pp. 1-6 (Year: 1994).*
International Search Report and Written Opinion—PCT/US2024/035573—ISA/EPO—Sep. 30, 2024.
Austin J., et al., "Program Synthesis with Large Language Models", ArXiv: 2108.07732v1 [cs], 34 Pages, Aug. 16, 2021.
Balog M., et al., "DeepCoder: Learning to Write Programs", ArXiv: 1611.01989v2, 21 Pages, Mar. 8, 2017, p. 20.
Balzer R., "A 15 Year Perspective on Automatic Programming", IEEE Transactions on Software Engineering, vol. SE-11, Issue. 11, pp. 1257-1268, Nov. 1985.
Biermann A.W., "Automatic Programming: A Tutorial on formal Methodologies", Journal of Symbolic Computation, vol. 1, Issue. 2, pp. 119-142, Jun. 1985.
Bornholt J., "Program Synthesis Explained", 9 Pages, Jan. 2015.
Brown T.B., et al., "Language Models are Few-Shot Learners", ArXiv: 2005.14165v4 [cs], Jul. 22, 2020, 75 Pages.
Chen A., et al., "Improving Code Generation by Training with Natural Language Feedback", ArXiv: 2303.16749v1 [cs], 20 Pages, Mar. 28, 2023.
Chen B., et al., "CodeT: Code Generation with Generated Tests", ArXiv: 2207.10397v2 [cs] Version: 2, 2022, 19 Pages, Nov. 23, 2022.
Chen M., et al., "Evaluating Large Language Models Trained on Code", ArXiv: 2107.03374v2 [cs], 35 Pages, Jul. 14, 2021.
Chen X., et al., "Teaching Large Language Models to Self-Debug", ArXiv: 2304.05128v1 [cs], 68 Pages, Apr. 11, 2023.
Copet J., et al., "Simple and Controllable Music Generation", ArXiv: 2306.05284v1 [cs, eess], 15 Pages, Jun. 8, 2023.
Dastin J., "Microsoft Attracting Users to its Code-Writing, Generative AI Software", Reuters, 10 Pages, Jan. 2023.
Devlin J., et al., "BERT: Pre-Training of Deep Bidirectional Transformers for Language Understanding", ArXiv: 1810.04805v2 [cs], 16 Pages, May 24, 2019.
Ellis K., et al., "DreamCoder: Growing Generalizable, Interpretable Knowledge with Wake-Sleep Bayesian Program Learning", ArXiv: 2006.08381v1 [cs], 22 Pages, Jun. 15, 2020.
Goldberg A.T., "Knowledge-based Programming: A Survey of Program Design and Construction Techniques", IEEE Transactions on Software Engineering, vol. SE-12, No. 7, pp. 752-768, Jul. 1986.
Gunasekar S., et al., "Textbooks Are All You Need", ArXiv:2306.11644v1 [cs], 26 Pages, Jun. 20, 2023.
Haluptzok P., et al., "Language Models Can Teach Themselves to Program Better", ArXiv: 2207.14502v4 [cs], 23 Pages, Apr. 12, 2023.
Hendrycks D., et al., "Measuring Coding Challenge Competence with APPS", ArXiv: 2105.09938v3 [cs], 22 Pages, Nov. 8, 2021.
Kulal S., et al., "SPOC: Search-based Pseudocode to Code", In Advances in Neural Information Processing Systems, vol. 32, Curran Associates Inc, 11 Pages, Jun. 12, 2019.
Le H., et al., "CodeRL: Mastering Code Generation through Pretrained Models and Deep Reinforcement Learning", ArXiv: 2207.01780v3 [cs], 33 Pages, Nov. 3, 2022.
Li R., et al., "StarCoder: May the Source be with You!", ArXiv: 2305.06161v1 [cs], 54 Pages, May 9, 2023.
Li Y., et al., "Competition-Level Code Generation with AlphaCode", Science, vol. 378, Issue. 6624, pp. 1092-1097, Dec. 9, 2022.
Liu J., et al., "RLTF: Reinforcement Learning from Unit Test Feedback", ArXiv: 2307.04349v1 [cs], 14 Pages, Jul. 10, 2023.
Luo Z., et al., "WizardCoder: Empowering Code Large Language Models with Evol-Instruct", ArXiv: 2306.08568v1 [cs], 13 Pages, Jun. 14, 2023.
Nijkamp E., et al., "CodeGen2: Lessons for Training LLMs on Programming and Natural Languages", ArXiv: 2305.02309v2 [cs], 12 Pages, Jul. 11, 2023.
Nye M., et al., "Show Your Work: Scratchpads for Intermediate Computation with Language Models", ArXiv: 2112.00114v1 [cs], 16 Pages, Nov. 30, 2021.
Olausson T.X., et al., "Demystifying GPT Self-Repair for Code Generation", ArXiv: 2306.09896v3 [cs], 38 Pages, Jun. 22, 2023.
Radford A., et al., "Improving Language Understanding by Generative Pre-Training", 12 Pages, 2018.
Ramesh A., et al., "Hierarchical Text-Conditional Image Generation with CLIP Latents", ArXiv: 2204.06125v1 [cs], 27 Pages, Apr. 13, 2022.
Saharia C., et al., "Photorealistic Text-to-Image Diffusion Models with Deep Language Understanding", ArXiv: 2205.11487v1 [cs], 46 Pages, May 23, 2022.
Schuster T., et al., "Programming Puzzles", ArXiv: 2106.05784v3 [cs], 38 Pages, Nov. 6, 2021.
Shazeer N., "Fast Transformer Decoding: One Write-Head is All You Need", ArXiv: 1911.02150v1 [cs], 9 Pages, Nov. 6, 2019.
Shojaee P., et al., "Execution-based Code Generation using Deep Reinforcement Learning", ArXiv: 2301.13816v4 [cs], 26 Pages, Jul. 19, 2023.
Vaswani A., et al., "Attention Is All You Need", ArXiv: 1706.03762v7 [cs], 15 Pages, Aug. 2, 2023.
Wang Y., et al., "CodeT5: Identifier-Aware Unified Pre-Trained Encoder-Decoder Models for Code Understanding and Generation", ArXiv: 2109.00859v1 [cs], 13 Pages, Sep. 2, 2021.
Wang Y., et al., "CodeT5+: Open Code Large Language Models for Code Understanding and Generation", ArXiv: 2305.07922v2 [cs], 26 Pages, May 20, 2023.
Wei J., et al., "Finetuned Language Models Are Zero-Shot Learners", ArXiv: 2109.01652v5 [cs], 46 Pages, Feb. 8, 2022.
Xu W., et al., Reprompting: Automated Chain-of-Thought Prompt Inference Through Gibbs Sampling, ArXiv: 2305.09993v1 [cs], 14 Pages, May 17, 2023.
Zelikman E., et al., "STaR: Bootstrapping Reasoning with Reasoning", ArXiv: 2203.14465v2 [cs], 30 Pages, May 20, 2022.
Zhang K., et al., "Self-Edit: Fault-Aware Code Editor for Code Generation", ArXiv: 2305.04087v3 [cs], 17 Pages, Jun. 5, 2023.
Zhang T., et al., "Coder Reviewer Reranking for Code Generation", ArXiv: 2211.16490v1 [cs], Version 1, 15 Pages, Nov. 29, 2022.
Ziegler A., et al., "Productivity Assessment of Neural Code Completion", In Proceedings of the 6th ACM SIGPLAN International Symposium on Machine Programming, pp. 1-15, San Diego, CA, USA, ACM, May 13, 2022.

* cited by examiner

BOOTSTRAPPING PROGRAM SYNTHESIS LANGUAGE MODELS TO PERFORM REPAIRING

INTRODUCTION

Aspects of the present disclosure relate to machine learning.

A wide variety of machine learning model architectures have proliferated and have been used to provide solutions for a multitude of prediction problems. Language models (also referred to as large language models (LLMs)) are a class of models that learn to generate text, such as natural language. Language models have been used for a variety of solutions, including chat bots, program synthesis, and the like. In program synthesis tasks, the model attempts to learn to generate computer program code that can be executed (by a computer) to perform a desired task. In some conventional systems, neural-guided program synthesis approaches relied on using a domain-specific language (DSL) due to the extremely large search space of popular programming languages.

In some conventional approaches, language models for program synthesis have been developed to improve upon DSL-based approaches. These language models may be trained and evaluated on programming competition datasets (e.g., the Mostly Basic Python Programming (MBPP) dataset, or the Automated Programming Progress Standard (APPS) dataset). Such datasets generally contain prompts describing a computational task or problem that the generated program should solve or satisfy, as well as one or more samples of program code (e.g., authored by human programmers) that solve or perform the task. However, such datasets are substantially limited in size (with relatively few exemplars) and quality (where some of the purported solutions do not work, or do not solve the corresponding task). Problematically, many machine learning models (and large language models in particular) rely on vast amounts of highly accurate training data to learn to produce accurate output.

BRIEF SUMMARY

Certain aspects provide a processing system comprising: one or more memories comprising processor-executable instructions; and one or more processors configured to execute the processor-executable instructions and cause the processing system to: access a first input indicating a first programming task; generate a first generated program, wherein, to generate the first generated program, the one or more processors are configured to execute the processor-executable instructions to cause the processing system to process the first input using a trained machine learning model; determine that the first generated program failed to satisfy the first programming task; generate first feedback based on the determination that the first generated program failed to satisfy the first programming task; generate a first revised program, wherein, to generate the first revised program, the one or more processors are configured to execute the processor-executable instructions to cause the processing system to process the first feedback using the trained machine learning model; determine that the first revised program satisfied the first programming task; and update one or more parameters of the trained machine learning model based on the first revised program in response to the determination that the first revised program satisfied the first programming task.

Certain aspects provide a method, comprising: accessing a first input indicating a first programming task; generating a first generated program based on processing the first input using a trained machine learning model; in response to determining that the first generated program failed to satisfy the first programming task: generating first feedback based on the determination that the first generated program failed to satisfy the first programming task; and generating a first revised program based on processing the first feedback using the trained machine learning model; and in response to determining that the first revised program satisfied the first programming task, updating one or more parameters of the trained machine learning model based on the first revised program.

Certain aspects provide one or more non-transitory computer-readable media comprising computer-executable instructions that, when executed by one or more processors of one or more processing systems, cause the one or more processing systems to: access a first input indicating a first programming task; generate a first generated program, wherein, to generate the first generated program, the one or more non-transitory computer-readable media further comprise computer-executable instructions that, when executed by the one or more processors, cause the one or more processing systems to process the first input using a trained machine learning model; determine that the first generated program failed to satisfy the first programming task; generate first feedback based on the determination that the first generated program failed to satisfy the first programming task; generate a first revised program, wherein, to generate the first revised program, the one or more non-transitory computer-readable media further comprise computer-executable instructions that, when executed by the one or more processors, cause the one or more processing systems to process the first feedback using the trained machine learning model; determine that the first revised program satisfied the first programming task; and update one or more parameters of the trained machine learning model based on the first revised program in response to the determination that the first revised program satisfied the first programming task.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
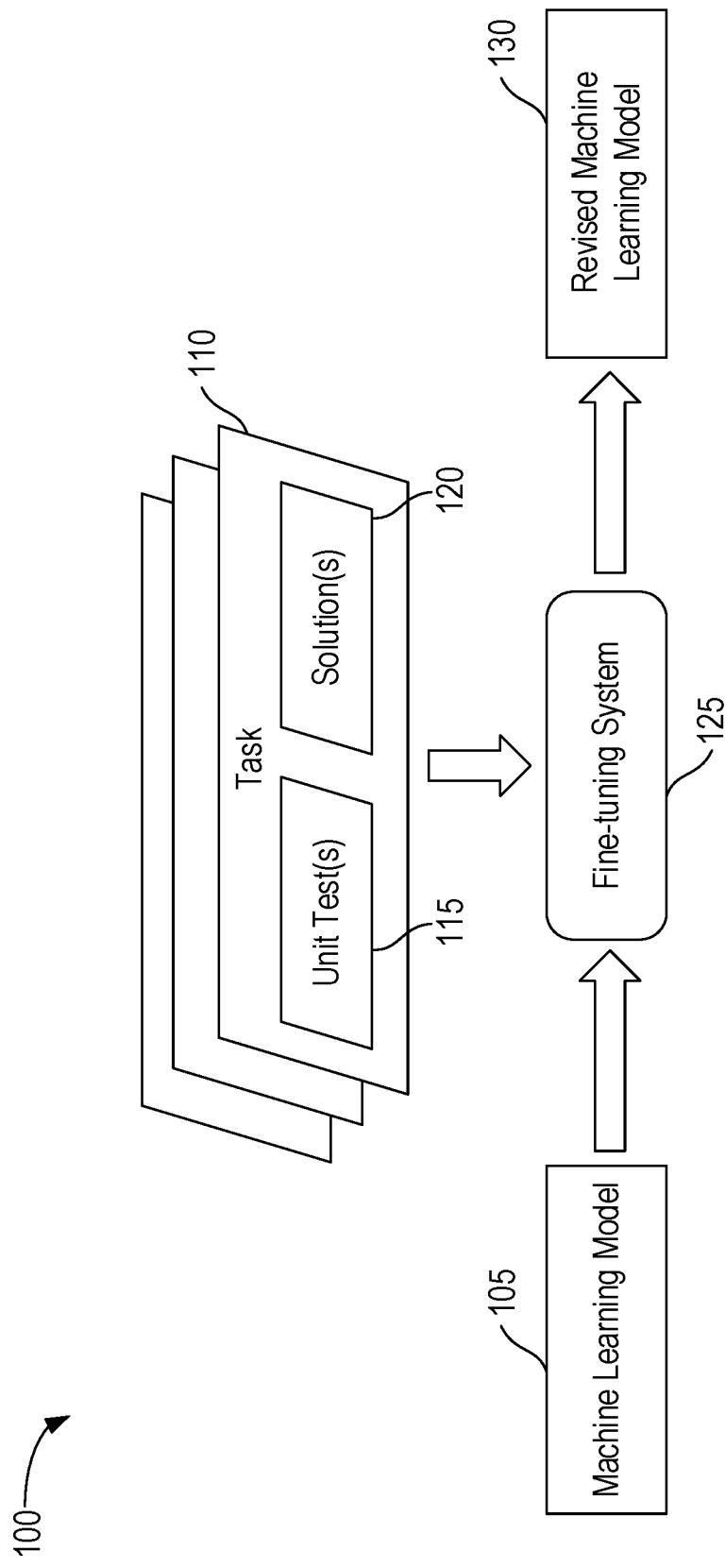
FIG. 1 illustrates an example environment for improved updating of program synthesis machine learning models, according to various aspects of the present disclosure.

Aspects of the present disclosure provide apparatuses, methods, processing systems, and computer-readable mediums for improved training and fine-tuning of machine learning models using bootstrapping and program repair.

In aspects of the present disclosure, machine learning models (e.g., large language models) can be trained, updated, and/or fine-tuned using a combination of bootstrapping and program repair. As used herein "fine-tuning" refers to updating the parameter(s) of a machine learning model that has already been at least partially trained (often referred to as a foundational model). For example, a model may be trained using one set of data, and fine-tuned for a specific task (e.g., program synthesis) based on a set of fine-tuning data. As used herein, "bootstrapping" generally refers to the use of the output of the model to refine the model itself. For example, the system may use correctly generated output (e.g., synthesized programs that accurately perform the desired task) as training data during a refinement or fine-tuning stage.

Additionally, as used herein, "repairing" refers to the process of iteratively attempting to produce improved program code. For example, if an initial synthesized program fails to solve or satisfy the task (e.g., because of compilation errors, runtime errors, or errors in the logic of the program), the system may use these errors to prompt the model to generate an updated program (e.g., to attempt to repair the first generated program). This use of bootstrapping with an iterative repairing process can enable improved fine-tuning of the models, resulting in substantially improved prediction accuracy (e.g., improved ability to generate program code that satisfies the desired task).

In some aspects, using a coding language model (also referred to as a program synthesis machine learning model), the machine learning system generates a code solution (also referred to as a generated program) for a programming problem or task. The machine learning system may then attempt to verify or validate the generated program (e.g., using a compiler, using test cases, and the like) to decide whether the generated code is accurate (e.g., whether the generated code can be compiled into a valid program that accurately solves or satisfies the desired task).

In some aspects, if the generated program fails validation, feedback indicating this failure (e.g., compiler/interpreter information) can be provided as input to the machine learning model, prompting the model to generate a new program (referred to in some aspects as a revised program). In some aspects, if the model produces a correct answer (e.g., code that validly compiles and solves the problem), this model output can be used during a fine-tuning phase. In some aspects, if the model fails to produce a correct solution (e.g., the revised code still fails), the system may use a ground-truth solution for the task during the fine-tuning phase.

In this way, during fine-tuning, the model can be substantially improved as compared to some conventional training and fine-tuning approaches that rely on the programming task datasets themselves. For example, using aspects of the present disclosure, the model is exposed to more diverse training data (potentially including information from the compiler/interpreter), which may be of higher quality than that of the ground-truth in the available dataset(s). Additionally, allowing the model to attempt to repair faulty programs can result in substantially improved output, and this iterative improvement process yields more helpful fine-tuning data.

Example Environment for Improved Updating of Program Synthesis Machine Learning Models FIG. 1 illustrates an example environment 100 for improved updating of program synthesis machine learning models, according to various aspects of the present disclosure.

In the illustrated environment 100, a set of task descriptions 110 are accessed by a fine-tuning system 125. In some aspects, the fine-tuning system 125 corresponds to a computing system that fine-tunes (e.g., updates) trained machine learning models to improve (or attempt to improve) the inferencing accuracy of the models. In some aspects, the fine-tuning system 125 may additionally serve as a training system (e.g., the computing system that initially trains the model) and/or as an inferencing system (e.g., the computing system that uses the trained and/or fine-tuned models to generate inferences during runtime).

In the illustrated example, the fine-tuning system 125 further accesses a machine learning model 105 The fine-tuning system 125 uses the task descriptions 110 to update or revise the machine learning model 105 in order to generate a revised machine learning model 130. As used herein, "accessing" data (e.g., parameters for a model) can generally include receiving, retrieving, requesting, collecting, obtaining, generating, or otherwise gaining access to the data (e.g., parameters for the model).

In some aspects, the machine learning model 105 is a pre-trained machine learning model, such as a large language model. In some aspects, the machine learning model 105 has been trained for program synthesis and is revised or fine-tuned (e.g., by the fine-tuning system 125) to generate more accurate programs. As discussed above, program synthesis generally corresponds to generation of computer program code that can be compiled and executed to perform a desired task. In some aspects, the machine learning model 105 is initially trained based on relatively large corpora of code, allowing the machine learning model 105 to learn to synthesize new code. During the fine-tuning phase (also referred to as a refinement stage, an updating stage, or simply as a training stage), the fine-tuning system 125 uses the task descriptions 110 to teach the machine learning model (revised machine learning model 130) how to generate program code that solves desired tasks.

In some aspects, the task descriptions 110 each generally include a description of a programming task (also referred to as a prompt), as well as one or more unit tests 115 (also referred to as test cases and/or asserts in some aspects) and one or more solutions 120 (also referred to as ground-truth or labels). For example, in some aspects, the task descriptions 110 may correspond to samples from programming competition datasets (e.g., the MBPP dataset and/or the APPS dataset).

In some aspects, the prompt portion of the task description 110 may include a natural language description (e.g., describing the task in natural language) and/or a logical description (e.g., describing the task in terms of Boolean logic or other operators). For example, the task description 110 may include a prompt such as "write a function to find the first repeated character in a given string." Additional examples may include, without limitation, prompts such as "write a function to find the longest chain which can be formed from a given set of pairs," or "write a function to get a lucid number smaller than or equal to n." Generally, the prompts may be of any length, and may include unstructured natural language, as well as other information such as numerical data, structured data, and the like.

In some aspects, each task description 110 may include zero or more unit tests 115. Generally, each unit test 115 specifies a test that can be used to judge the validity or accuracy of generated code. For example, continuing the above programming task to find repeated characters in a string, one unit test 115 may specify that the program should output the character "A" when given the string "ABCABC." In some aspects, some or all of these unit tests 115 are provided to the machine learning model 105 as part of the input (along with the prompt), as discussed in more detail below. In some aspects, some or all of these unit tests 115 are hidden (e.g., not provided to the model) and are used to validate the resulting code.

In some aspects, the solution(s) 120 generally indicate one or more ground-truth solutions for the corresponding programming task. That is, the solutions 120 may generally include computer program code that (purportedly) solves the task, such as code that can be compiled and executed to find and output the first repeated character in a string. In some aspects, some or all of the solutions 120 are manually authored (e.g., by programmers) and/or are generated by other program synthesis models. Although referred to as "solutions" and "ground-truth" answers in some examples described herein, in some aspects, one or more of the solutions 120 may, in fact, contain erroneous answers. That is, the solution(s) 120 may themselves contain errors that result in invalid code (e.g., code that does not compile, code that returns incorrect answers, and the like). Such errors are unfortunately common in many available datasets. However, using aspects of the present disclosure to provide bootstrapping and program repairing, the resulting revised machine learning model 130 may nevertheless be substantially improved. For example, because the validity of the model output is determined based on criteria other than the solution 120 itself, and the fine-tuning system 125 can use labels other than the solution 120 itself, the model may be fine-tuned based on more accurate data.

In some aspects, the fine-tuning system 125 can process each task description 110 (e.g., natural language text describing a programming task) using the machine learning model 105 to generate a corresponding program. The fine-tuning system 125 may then validate (or attempt to validate) the generated program, such as by determining whether the program compiles successfully (as opposed to generating compilation or interpreter error(s)), whether the program runs successfully (as opposed to generating runtime error(s)), and/or whether the program processes the unit test(s) 115 correctly (e.g., whether the program returns correct results based on the tests). In some aspects, if the generated program is validated (e.g., the program successfully performs the programming task), the fine-tuning system 125 may use the generated program as a ground-truth label to fine-tune the machine learning model 105 (either immediately, or after a number of task descriptions 110 have been processed), as discussed below in more detail.

In some aspects, if the generated program fails validation (e.g., the program caused errors to be generated and/or returned inaccurate results), the fine-tuning system 125 may prompt the machine learning model 105 to attempt to repair the code and/or to generate new code. For example, the fine-tuning system 125 may provide feedback (such as the generated error(s)) as input, allowing the machine learning model 105 to generate revised code. As discussed below in more detail, this revised code may comprise the originally generated code with revisions or repair attempts (e.g., modifications to the program) and/or may comprise entirely new code (e.g., the model may attempt to write an entirely new program).

In some aspects, the fine-tuning system 125 may similarly validate (or attempt to validate) the revised program. If this revised program is validated successfully, in some aspects, the fine-tuning system 125 may use the revised program as a ground-truth label to fine-tune the machine learning model 105 (either immediately, or after a number of task descriptions 110 have been processed), as discussed below in more detail. In some aspects, if the revised program still fails validation, the fine-tuning system 125 may use the solution 120 of the task description 110 as the ground-truth to fine-tune the model, as discussed in more detail below In some aspects, the fine-tuning system 125 (or another system) can deploy the revised machine learning model 130 for inferencing after fine-tuning. Generally, deploying the revised machine learning model 130 may include any operations or procedures to provide the revised machine learning model 130 for inferencing, including indicating or transmitting the updated parameter(s) to an inferencing system, instantiating or storing the updated model for local inferencing, and the like.

In some aspects, the fine-tuning system 125 may perform multiple iterations of fine-tuning. For example, after processing each task description 110 to generate fine-tuning exemplars and updating the machine learning model 105 using these exemplars (to generate the revised machine learning model 130), the fine-tuning system 125 may then repeat this process to further fine-tune the revised machine learning model 130. That is, the fine-tuning system 125 may re-process the task descriptions 110 using the revised machine learning model 130 to generate new fine-tuning exemplars and use these new exemplars to further fine-tune the revised machine learning model 130. In this way, the fine-tuning system 125 can use bootstrapping and program repairing to substantially improve the prediction performance of the machine learning model, resulting in more accurate and reliable program synthesis.

Figure 2:
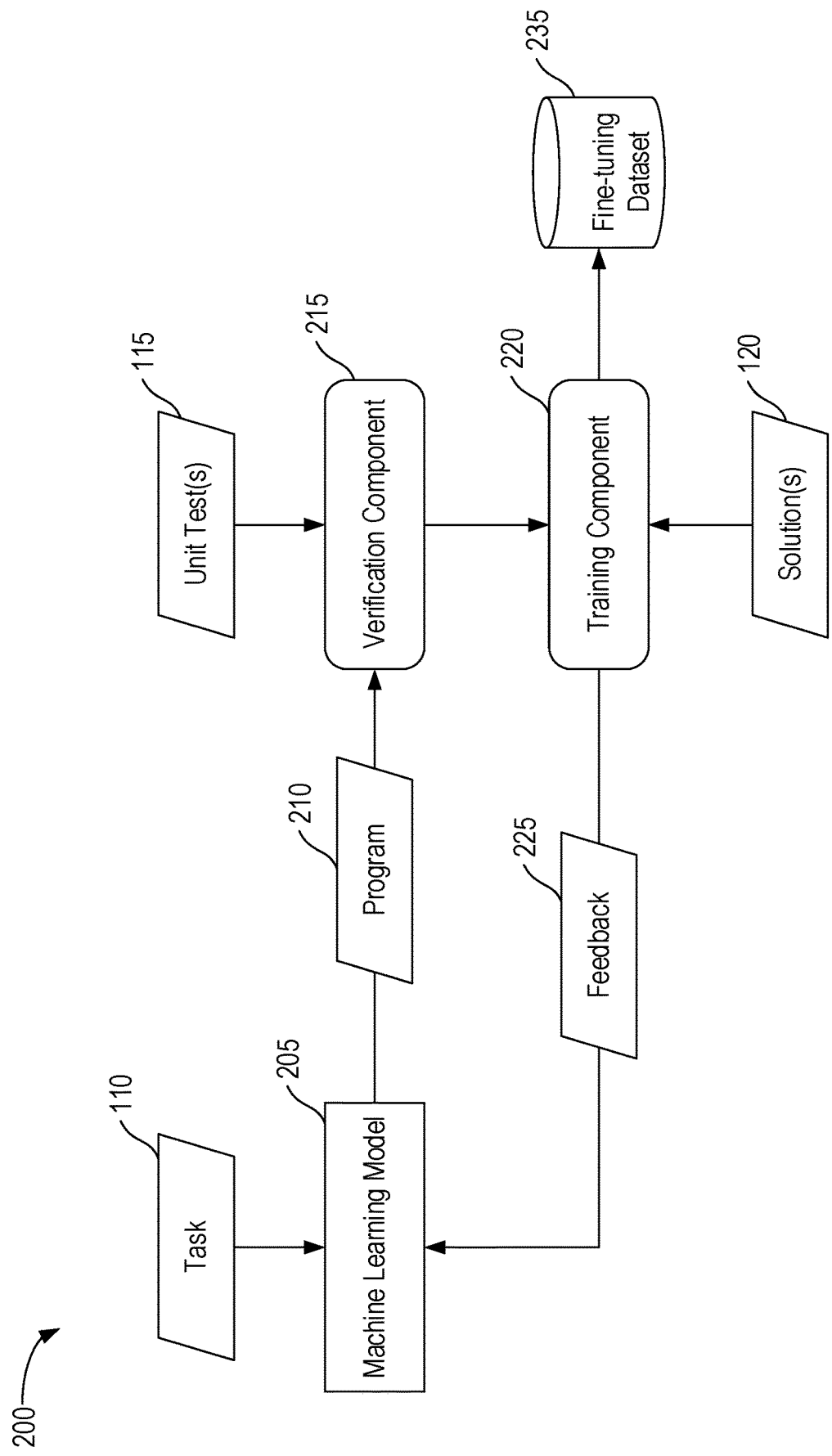
FIG. 2 depicts an example workflow for improved updating of program synthesis machine learning models, according to various aspects of the present disclosure.

Example Workflow for Improved Updating of Program Synthesis Machine Learning Models FIG. 2 depicts an example workflow 200 for improved updating of program synthesis machine learning models, according to various aspects of the present disclosure. In some aspects, the workflow 200 is performed by a fine-tuning system, such as the fine-tuning system 125 of FIG. 1.

That is, the depicted components (e.g., a verification component 215 and a training component 220) may be components of a fine-tuning system. Though depicted as discrete components for conceptual clarity, the depicted components (and others not illustrated) may be combined or distributed across any number of devices and components, and may generally be implemented using hardware, software, or a combination of hardware and software.

In the illustrated workflow 200, the fine-tuning system accesses a task description 110 and processes the task description 110 using a machine learning model 205 to generate a program 210. In some aspects, as discussed above, the task description 110 comprises a natural language description of a programming task, such as: "write a program that finds the first repeated character in an input string." In some aspects, as discussed above, the task description 110 further includes a unit test or assert, such as specifying an input and the intended output (e.g., indicating that the program should output "B" when the input is "ABCDBA").

As discussed above, in some aspects, the task description 110 may contain or be associated with one or more unit tests (e.g., unit tests 115 of FIG. 1). In some aspects, the fine-tuning system may retain at least one unit test as a hidden test. That is, the fine-tuning system may optionally provide one or more unit tests in the prompt to the machine learning model 205, but may ensure that at least one unit test is kept as hidden (e.g., to use for validation of the generated program).

In some aspects, the machine learning model 205 corresponds to a pre-trained model, such as the machine learning model 105 of FIG. 1. The program 210 generally comprises computer program code, generated by the machine learning model 205 based on the prompt (e.g., based on processing the task description 110 and/or unit test(s)) to (attempt to) solve the described programming task. Generally, the program 210 may comprise code in any programming language and using any suitable formatting (e.g., any formatting, depending on the particular language, that can be compiled and executed).

In the illustrated example, the generated program 210 is accessed by the verification component 215 for evaluation (also referred to as verification and/or validation). In some aspects, as discussed above, the verification component 215 may validate the program 210 at least in part by determining whether the program 210 causes any errors to be generated. For example, the verification component 215 may determine whether any compilation errors occur when the verification component 215 (or another component) attempts to compile or interpret the program 210, and/or whether any runtime errors occur when the verification component 215 (or another component) attempts to process input data using the program 210). In some aspects, if any errors are generated, the verification component 215 may determine that the program 210 has failed to solve (also referred to as failing to satisfy) the programming task.

In the illustrated workflow 200, the verification component 215 may also access one or more unit tests 115 associated with the task description 110. The verification component 215 may use the unit test(s) to validate the program 210. For example, the verification component 215 may process the input portion of a given unit test 115 using the program 210 to generate output, and the verification component 215 may compare the program output with the intended output portion of the unit test 115. In some aspects, if the verification component 215 determines that any unit tests 115 are failed (due to inaccurate output), the verification component 215 may determine that the program 210 has failed to solve the programming task.

In the illustrated workflow 200, the verification component 215 indicates to the training component 220 the results of the validation. In some aspects, the verification component 215 may indicate that the program 210 has failed, without providing additional detail or explanation. This may be referred to as a "simple feedback" implementation, in some aspects. In some aspects, the verification component 215 may provide additional detail, such as error explanations indicating the cause of failure (e.g., indicating the particular error(s) generated and/or indicating that one or more unit tests 115 were failed). This may be referred to as "full feedback" in some implementations. In some aspects, if available, the training component 220 may additionally provide suggestions or more detailed input. For example, if the interpreter and/or compiler are configured to provide more detailed suggestions (e.g., indicating the potential source of the error or suggesting fixes), the verification component 215 may include this detail in the feedback.

In some aspects, the training component 220 may take a variety of actions depending on the feedback provided by the verification component 215. For example, in the illustrated workflow 200, if the training component 220 determines that the program 210 successfully solved the programming task (also referred to as satisfying the task) (e.g., because no errors were generated, and the unit tests 115 were accurately processed), the training component 220 may add the program 210 as a fine-tuning exemplar in a fine-tuning dataset 235. In some aspects, to form the fine-tuning exemplar, the training component 220 may use the task description 110 (and, in some aspects, any unit tests 115 that were included in the prompt to the machine learning model 205) as the input portion of the exemplar, and the training component 220 may use the generated program 210 as the target output. That is, rather than using a ground-truth solution (e.g., the solution 120 of FIG. 1) as the label, the training component 220 can use the output of the machine learning model 205 itself.

In some aspects, if the training component 220 determines that the program 210 has failed to successfully satisfy the programming task, the training component 220 may determine whether to attempt to repair the program 210. For example, in some aspects, the fine-tuning system may use a defined or maximum number of repairing iterations (e.g., allowing the machine learning model 205 to repair the program a maximum number of times). In some aspects, the fine-tuning system may allow for a single repairing attempt. That is, if the first program 210 fails validation, the training component 220 may prompt the machine learning model 205 to repair the code once. If the revised program also fails, the training component 220 may determine to use the ground-truth solution, as discussed above and in more detail below.

In the illustrated workflow 200, if the training component 220 determines to attempt to repair the program 210, the training component 220 provides feedback 225 as input to the machine learning model 205. In some aspects, as discussed above, the feedback can include simple feedback (e.g., text indicating failure, such as "That is incorrect. Please try again") and/or more complex feedback (e.g., text indicating the particular error(s) that occurred). In some aspects, the feedback 225 generally comprises natural language text.

In some aspects, to use the feedback 225 as input, the training component 220 may additionally provide other data as input to the machine learning model 205. For example, in some aspects, the training component 220 may provide the original task description 110, the feedback 225, and/or the original program 210 as input. In some aspects, the training component 220 may concatenate some or all of the task description 110, the program 210, and the feedback 225, and use this concatenated text as the input prompt to the machine learning model 205. Using this prompt, the machine learning model 205 may generate a revised program (which may be represented in the illustrated example as the program 210). As discussed above, the revised program may correspond to an updated version of the original program 210. Alternatively, the revised program may be an entirely new program with newly drafted code.

In the illustrated workflow 200, the verification component 215 can similarly evaluate the revised program to attempt to validate or verify the revised code, as discussed above. The results of this verification can similarly be provided to the training component 220, as discussed above.

As illustrated, the training component 220 can similarly evaluate the results of the verification for the revised program to determine whether the revised program satisfies the programming task. If so, as discussed above, the revised program may be used as a ground truth for fine-tuning the model. For example, the training component 220 may add the revised program as a fine-tuning exemplar in the fine-tuning dataset 235. In some aspects, to form the fine-tuning exemplar based on the revised program, the training component 220 may use the (revised) prompt (e.g., the task description 110, unit test(s), original program 210, and feedback 225) as the input portion of the exemplar and use the revised program as the target output. That is, the training component 220 may use the same string that was used to generate the revised program (e.g., the concatenated task, original (failed) program, and feedback) as the exemplar input, and the revised (e.g., repaired) program as the target output.

In the illustrated example, if the training component 220 determines that the revised program still fails validation, the training component 220 may again determine whether to attempt to repair the code. In some aspects, as discussed above, the training component 220 may use a defined or maximum number of repair iterations (e.g., allowing one attempt to repair). If this threshold has been reached, the training component 220 may use the solution(s) 120 as the ground-truth. In some aspects, if the training component 220 determines that the revised program still fails validation but for one or more different reasons, the number of repair iterations may not increase and/or may be reset.

That is, the training component 220 may add the solution(s) 120 as a fine-tuning exemplar in the fine-tuning dataset 235. In some aspects, to form the fine-tuning exemplar based on this failure to repair the program, the training component 220 may use the (revised) prompt (e.g., the task description 110, unit test(s), original program 210, and feedback 225) as the input portion of the exemplar and use the solution(s) 120 as the target output. That is, the training component 220 may use the same string that was used to generate the revised program (e.g., the concatenated task, original (failed) program, and feedback) as the exemplar input and the actual ground-truth solution as the target output.

In some aspects, the illustrated workflow 200 may be performed for each task description 110 in the set of examples that are available for fine-tuning the machine learning model 205. Once each task description 110 has been processed to generate a corresponding fine-tuning exemplar in the fine-tuning dataset 235, the fine-tuning system may use the fine-tuning dataset 235 to refine or update the parameters of the machine learning model 205.

Generally, the particular operations used to update the machine learning model 205 may vary depending on the particular architecture and implementation. For example, if the machine learning model 205 is implemented as a neural network, the fine-tuning system may process the input portion of each exemplar in the fine-tuning dataset 235 using the machine learning model 205 to generate an output program (or may access the program that was previously generated for the exemplar during the workflow 200, if the prior-generated program was saved for fine-tuning). The fine-tuning system may then compare the output portion of the exemplar (e.g., the correctly generated program 210, the correctly repaired program, or the solution 120) with the generated program in order to generate a loss. This loss can then be used to update the model parameter(s), such as using backpropagation.

Generally, the fine-tuning system may update the parameters of the machine learning model 205 using individual exemplars from the fine-tuning dataset 235 (e.g., using stochastic gradient descent) or using batches of exemplars (e.g., using batch gradient descent).

As discussed above, using the fine-tuning dataset 235, the fine-tuning system can thereby generate a refined or updated version of the machine learning model 205 (e.g., the revised machine learning model 130 of FIG. 1). In some aspects, this updated model can then be deployed for inferencing. In some aspects, as discussed above, the fine-tuning system may optionally perform another round of fine-tuning. That is, the fine-tuning system may repeat the workflow 200 for each task description 110 using the updated machine learning model in place of the original machine learning model 205.

This fine-tuning workflow can similarly be repeated any number of times, depending on the particular implementation. For example, the fine-tuning system may repeat the workflow 200 a defined number of times (e.g., a fixed number of fine-tuning iterations), until a desired accuracy or performance of the updated machine learning model is reached, until a defined amount of time and/or computational resources have been consumed during the fine-tuning, and the like.

Figure 3:
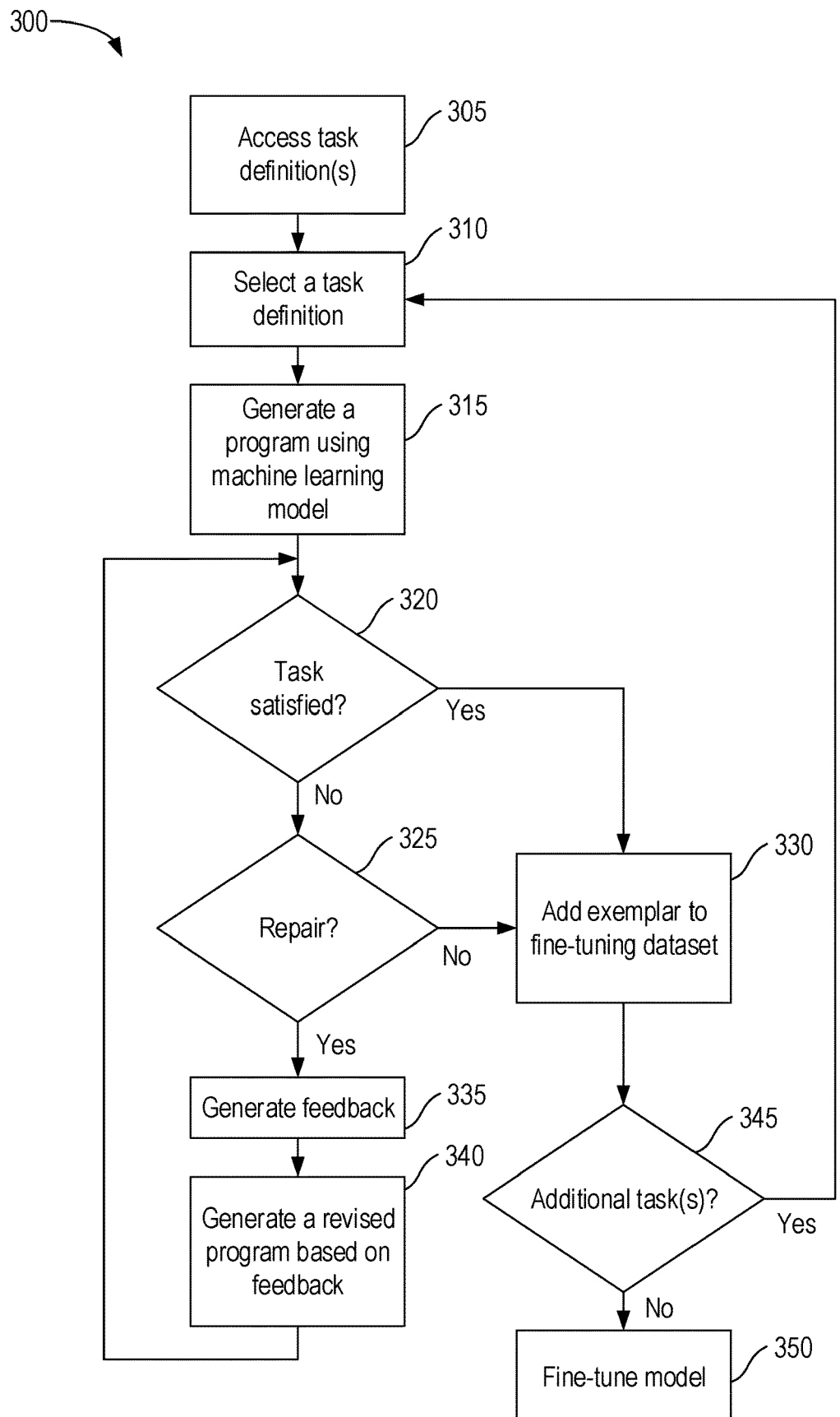
FIG. 3 is a flow diagram depicting an example method for improved updating of program synthesis machine learning models using bootstrapping and program repairing, according to various aspects of the present disclosure.

Example Method for Improved Updating of
Program Synthesis Machine Learning Models
Using Bootstrapping and Program Repairing FIG. 3 is a flow diagram depicting an example method 300 for improved updating of program synthesis machine learning models using bootstrapping and program repairing, according to various aspects of the present disclosure. In some aspects, the method 300 is performed by a fine-tuning system, such as the fine-tuning system 125 of FIG. 1. In some aspects, the method 300 provides additional detail for the workflow 200 of FIG. 2.

At block 305, the fine-tuning system accesses a set of task definitions (e.g., the task descriptions 110 of FIGS. 1 and 2). As discussed above, the task descriptions generally describe or indicate programming tasks, such as using natural language to describe the desired functionality of a program. In some aspects, as discussed above, each task definition may include one or more unit tests (e.g., the unit tests 115 of FIGS. 1 and 2) that can be used to verify the functionality of code (e.g., to verify that the code satisfies the programming task). In some aspects, each task definition may further include one or more solutions (e.g., the solutions 120 of FIGS. 1 and 2) corresponding to program code that (purportedly) satisfies the programming task. For example, the solutions may be human-authored programs to perform the task. Generally, the fine-tuning system may access the task definitions from any suitable repository, including local storage, remote storage, publicly accessible exemplars (e.g., the MBPP and/or APPS datasets), and the like.

At block 310, the fine-tuning system selects one of the task definitions. Generally, the fine-tuning system may use any suitable technique to select the task definition (including randomly or pseudo-randomly), as each task in the set will be selected for evaluation during the method 300.

At block 315, the fine-tuning system generates a program (e.g., the program 210 of FIG. 2) using a machine learning model (e.g., the machine learning model 205 of FIG. 2). For example, as discussed above, the fine-tuning system may use the natural language task description as input to the machine learning model, prompting the model to generate a synthesized program that attempts to satisfy the task. In some aspects, as discussed above, the fine-tuning system may further use one or more of the unit tests (if available) for the task as further input (e.g., concatenating the task description and the unit test, and using the concatenated text as input).

At block 320, the fine-tuning system determines whether the programming task was satisfied by the generated program. That is, the fine-tuning system may determine whether the generated program satisfies or performs the desired programming task. In some aspects, as discussed above, the fine-tuning system may determine whether the task was satisfied based on determining whether the generated program generates or results in any errors (e.g., compilation or interpreter errors, runtime errors, and the like). In some aspects, the fine-tuning system may additionally or alternatively determine whether the task was satisfied based on determining whether the generated program accurately or successfully performs any (hidden) unit tests that are associated with the task description but that were not provided as input to the model.

If, at block 320, the fine-tuning system determines that the task was satisfied, the method 300 continues to block 330, discussed in more detail below. If the fine-tuning system determines that the task was not satisfied by the generated program, the method 300 continues to block 325.

At block 325, the fine-tuning system determines whether to attempt to repair the (failed) program. Generally, the fine-tuning system may use a variety of criteria to determine whether to repair the program, depending on the particular implementation. For example, in some aspects, the fine-tuning system may determine whether a maximum number of repair attempts have been performed (e.g., where the fine-tuning system attempts to repair the program once before moving on to the next exemplar). As another (non-limiting) example, the fine-tuning system may determine whether computational resources are available to repair the program. In some aspects, the fine-tuning system may evaluate the progress or improvement of the program repair. For example, the fine-tuning system may determine whether the most recently generated program is better than the previous version according to one or more metrics or key performance indicators (e.g., whether a revised version has fewer errors than the original version, solves more unit tests accurately, etc.). In some such aspects, if the program is improved, the fine-tuning system may determine to attempt another round of repair. If the program has not improved (or has worsened), the fine-tuning system may determine not to attempt any further repair. In some aspects, the fine-tuning system may revert the changes from the last round of repair.

If, at block 325, the fine-tuning system determines to not to repair the program, the method 300 continues to block 330, discussed in more detail below. If the fine-tuning system determines to repair the program (or attempt to repair the program), the method 300 continues to block 335.

At block 335, the fine-tuning system generates feedback based on the evaluation of the generated program. As discussed above, in some aspects, the feedback comprises simple feedback, such as noting that the program failed to satisfy the task (e.g., natural language text stating "That is incorrect. Please try again") without providing additional context or explanation. In some aspects, as discussed above, the feedback may comprise more complex feedback (e.g., full feedback), such as text indicating the particular errors that occurred, text noting that the unit test(s) failed, and the like.

At block 340, the fine-tuning system generates a revised program based on the feedback. For example, the fine-tuning system may process the feedback using the machine learning model to generate a revised program. In some aspects, as discussed above, the fine-tuning system may concatenate the feedback with other data to generate a new prompt for the model. For example, in some aspects, the fine-tuning system may concatenate the original prompt (e.g., the task description, which may include one or more unit tests), the original (or most recently generated) program (e.g., generated at block 315, and/or at block 340 during a prior repair attempt), and the feedback. This concatenated string may then be used as input to the machine learning model to generate a revised program. The method 300 then returns to block 320 to validate the revised program.

Returning to block 330, after the fine-tuning system determines that the program is correct (at block 320) or that no additional repair attempts should be made (at block 325), the fine-tuning system adds a new exemplar to the fine-tuning dataset (e.g., fine-tuning dataset 235 of FIG. 2) based on the selected task definition. In some aspects, as discussed above, the input portion of the new exemplar may correspond to the model input used to generate the most recent program (e.g., the task definition itself, or the task definition concatenated with incorrectly generated code and resulting feedback). The output portion of the exemplar may similarly vary depending on whether the program satisfied the task. For example, if the program (or revised program) accurately performed the task, the label or target output portion of the exemplar may include this generated program. If the program (or revised program) failed to satisfy the task, the target output may correspond to a ground-truth solution for the task (e.g., the solution 120 of FIGS. 1 and 2). One example method for adding the exemplar is discussed in more detail below with reference to FIG. 4.

This fine-tuning exemplar may then be stored in the fine-tuning dataset for subsequent use in updating the model. The method 300 then continues to block 345, where the fine-tuning system determines whether there is at least one additional task, remaining in the set, that has not yet been used to generate a fine-tuning exemplar during the current iteration of updating. If so, the method 300 returns to block 310 to select the next task definition. If not, the method 300 continues to block 350. Although the illustrated example depicts an iterative process for conceptual clarity (e.g., selecting and processing each task in sequence), in some aspects, the fine-tuning system may process some or all of the tasks in parallel.

At block 350, the fine-tuning system fine-tunes the machine learning model based on the fine-tuning dataset. For example, as discussed above, the fine-tuning system may determine or generate model output based on the input portion of each exemplar (e.g., by processing the string using the model), and compare this generated output with the target output portion of the exemplar (e.g., the accurately generated code, or the ground-truth program). The results of this comparison (e.g., a loss) may then be used to refine the model (e.g., using backpropagation) for each fine-tuning exemplar (e.g., using stochastic or batch gradient descent).

In the illustrated example, the method 300 terminates after block 350. In some aspects, as discussed above, the fine-tuning system may perform the fine-tuning operation (e.g., perform the method 300) repeatedly. For example, the fine-tuning system may use the updated version of the model (generated at block 350) as the (new) base model and perform the method 300 again to generate another updated version. This fine-tuning can continue for any number of iterations, such as until one or more termination criteria are met (e.g., a maximum number of iterations, a desired model accuracy, and the like).

In some aspects, after the fine-tuning is complete (e.g., after processing all fine-tuning exemplars in the dataset during the final fine-tuning iteration), the fine-tuning system may deploy the updated machine learning model for inferencing. As discussed above, deploying the model may generally include deploying the model locally (e.g., for inferencing by the fine-tuning system) and/or deploying the model to one or more other systems (e.g., dedicated inferencing systems).

Figure 4:
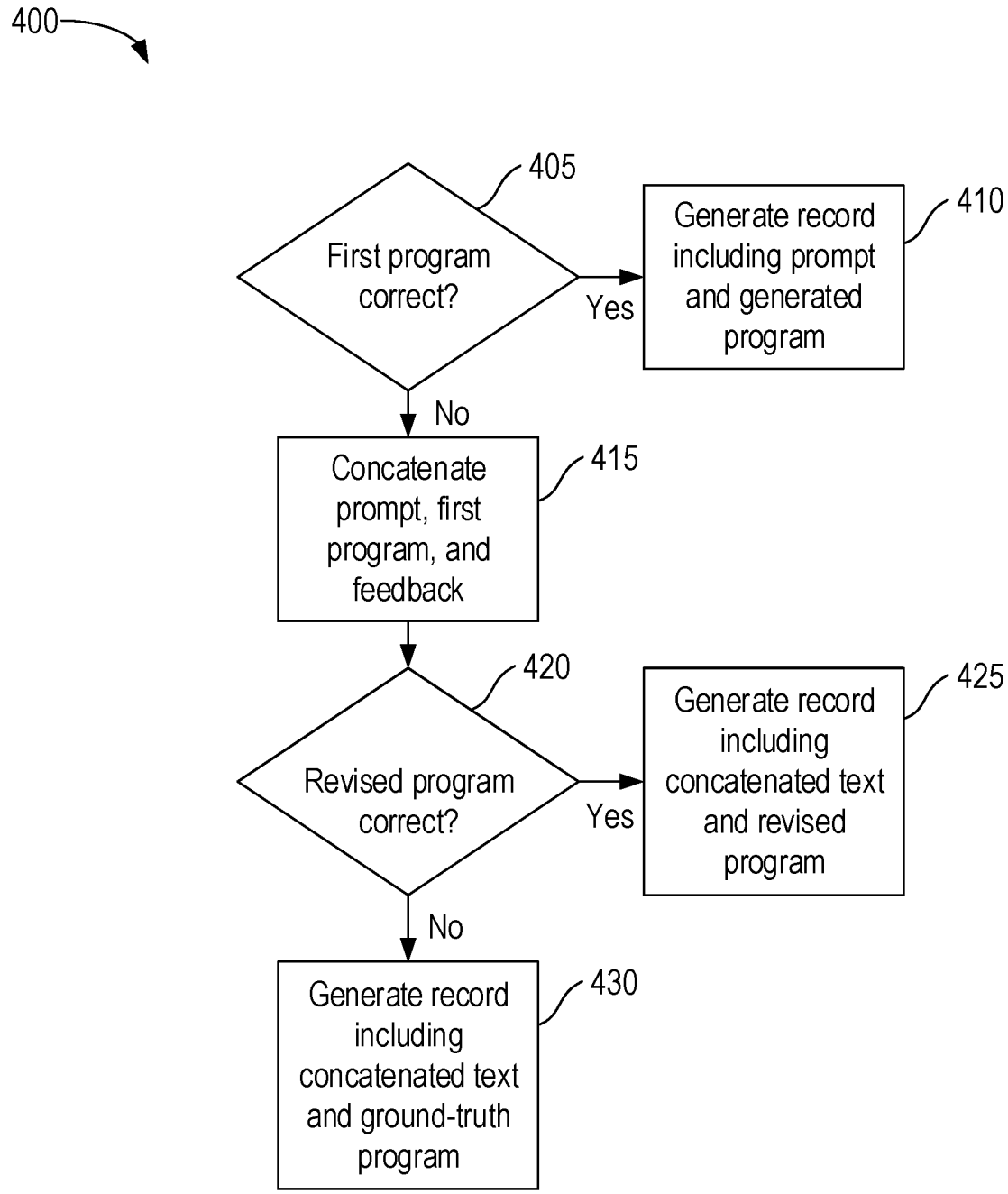
FIG. 4 is a flow diagram depicting an example method for generating fine-tuning data for program synthesis machine learning models, according to various aspects of the present disclosure.

Example Method for Generating Fine-Tuning Data for Program Synthesis Machine Learning Models FIG. 4 is a flow diagram depicting an example method 400 for generating fine-tuning data for program synthesis machine learning models, according to various aspects of the present disclosure. In some aspects, the method 400 is performed by a fine-tuning system, such as the fine-tuning system 125 of FIG. 1. In some aspects, the method 400 provides additional detail for block 330 of FIG. 3.

At block 405, the fine-tuning system determines whether the first generated program, for the task description, was correct. That is, the fine-tuning system determines whether the machine learning model generated a correct program that satisfied the programming task during the first attempt (e.g., where no repairing was used). For example, the fine-tuning system may determine whether the program generated at block 315 of FIG. 3 satisfied the task. If so, the method 400 continues to block 410.

At block 410, the fine-tuning system generates a fine-tuning record comprising the prompt used to generate the program, as well as the program generated by the model. For example, as discussed above, each fine-tuning record may comprise an input portion (e.g., the text string to be used as input to the model) and an output portion (e.g., the label to be used as ground-truth for the input portion during fine-tuning). At block 410, the input portion may correspond to the original task description (and, in some cases, unit test(s)) used to generate the program. The output portion comprises the generated program itself, allowing the fine-tuning system to use bootstrapping (rather than human-authored solutions) during fine-tuning.

Returning to block 405, if the fine-tuning system determines that the first program was not correct, the method 400 continues to block 415, where the fine-tuning system concatenates the original prompt (e.g., the task description and/or unit test(s)), the first (failed) program, and the feedback that was generated based on the failed program. Although the illustrated example depicts concatenating the first program, in some aspects, the fine-tuning system may concatenate the most-recent or final failed program. That is, if multiple repair attempts are used, the fine-tuning system may concatenate the prompt and feedback with the last or most recent attempt (rather than the first attempt) at generating the program.

At block 420, the fine-tuning system determines whether the (last) revised program was correct. That is, the fine-tuning system determines whether the machine learning model was able to generate a correct program based on the feedback, as discussed above. If so, the method 400 continues to block 425, where the fine-tuning system generates a fine-tuning record comprising the concatenated text (generated at block 415) and the revised program. For example, as discussed above, the concatenated text may correspond to the input portion of the record, and the revised program may correspond to the target output.

Returning to block 420, if the fine-tuning system determines that the (final) revised program also failed to satisfy the task, the method 400 continues to block 430. At block 430, the fine-tuning system generates a fine-tuning record comprising the concatenated text (generated at block 415) and a ground-truth program for the task. For example, as discussed above, the concatenated text may correspond to the input portion of the record, and the ground-truth program may correspond to the target output. In some aspects, as discussed above, the ground-truth program may be a human-authored solution for the programming task.

Although the illustrated example depicts generating a single fine-tuning record for each task description (e.g., at block 410, 425, or 430, depending on whether the program or revised program(s) succeeded in solving the task), in some aspects, the fine-tuning system may generate multiple records for some (or all) of the tasks. For example, in some aspects, if the fine-tuning system determines that the first program or the revised program for a given task was successfully validated, the fine-tuning system may generate a first record including this generated program as the target (e.g., at block 410 or 425), and generate a second record including the original (e.g., human-authored) ground-truth as the target.

Using the method 400, the fine-tuning system is able to dynamically generate fine-tuning records based on the performance of the model itself, allowing the fine-tuning system to use bootstrapping and repairing to generate improved and more diverse fine-tuning data, while retaining use of the ground-truth labels where the model fails to generate accurate outputs. This can substantially improve the accuracy of the updated model, as discussed above.

Example Method for Updating Machine Learning Models for Program Synthesis

Figure 5:
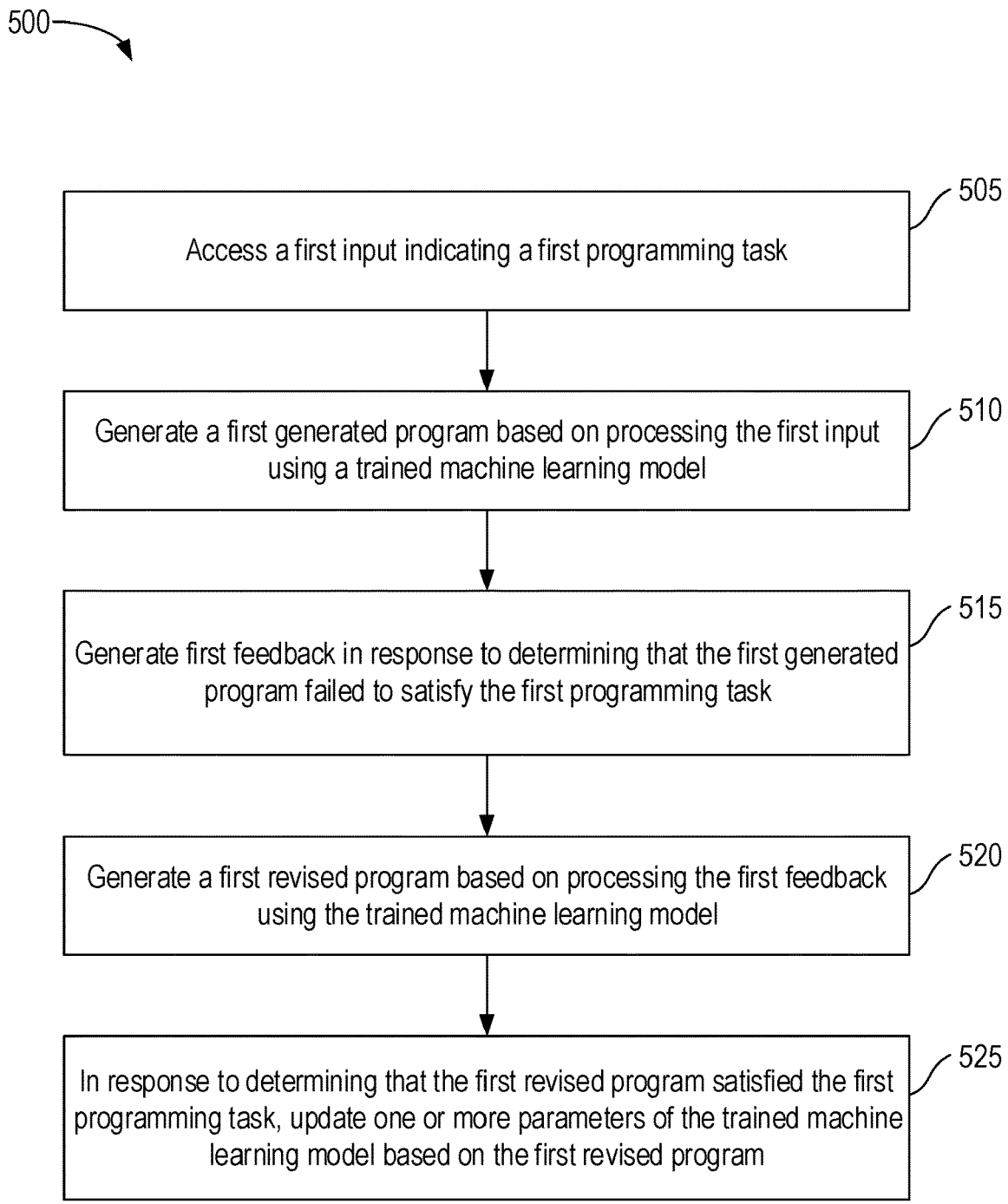
FIG. 5 is a flow diagram depicting an example method for updating machine learning models for program synthesis, according to various aspects of the present disclosure.

FIG. 5 is a flow diagram depicting an example method 500 for updating machine learning models for program synthesis, according to various aspects of the present disclosure. In some aspects, the method 500 is performed by a fine-tuning system, such as the fine-tuning system 125 of FIG. 1. In some aspects, the method 500 is performed by the verification component 215, training component 220, and/or using the machine learning model 205, each of FIG. 2. In some aspects, the method 500 is performed by a processing system, such as the processing system of FIG. 6. In some aspects, the method 500 provides additional detail for the method 300 of FIG. 3 and/or for the method 400 of FIG. 4.

At block 505, a first input indicating a first programming task is accessed. In some aspects, the first input comprises a natural language description of the first programming task. In some aspects, the first input further comprises a first unit test to verify accuracy of programs with respect to the first programming task.

At block 510, a first generated program is generated based on processing the first input using a trained machine learning model.

At block 515, first feedback is generated in response to determining that the first generated program failed to satisfy the first programming task.

In some aspects, the first feedback comprises an indication that the first generated program is incorrect. In some aspects, the first feedback further comprises one or more error explanations for the first generated program.

In some aspects, determining that the first generated program failed to satisfy the first programming task comprises at least one of: (i) determining that the first generated program caused one or more compilation errors, (ii) determining that the first generated program caused one or more runtime errors, or (iii) determining that the first generated program failed to accurately process one or more unit tests associated with the first programming task.

At block 520, a first revised program is generated based on processing the first feedback using the trained machine learning model.

In some aspects, generating the first revised program comprises generating a concatenated input based on concatenating the first input, the first generated program, and the first feedback and processing the concatenated input using the trained machine learning model.

At block 525, one or more parameters of the trained machine learning model are updated based on the first revised program in response to determining that the first revised program satisfied the first programming task.

In some aspects, the method 500 further includes accessing a second input indicating a second programming task, generating a second generated program based on processing the second input using the trained machine learning model, and, in response to determining that the second generated program satisfied the second programming task, updating one or more parameters of the trained machine learning model based further on the second generated program.

In some aspects, the method 500 further includes accessing a second input indicating a second programming task, and generating a second generated program based on processing the second input using the trained machine learning model. In some aspects, the method 500 further includes, in response to determining that the second generated program failed to satisfy the second programming task, generating second feedback based on the determination that the second generated program failed to satisfy the second programming task and generating a second revised program based on processing the second feedback using the trained machine learning model. In some aspects, the method 500 further includes, in response to determining that the second revised program failed to satisfy the second programming task, updating one or more parameters of the trained machine learning model based further on a ground-truth program for the second programming task.

Example Processing System for Training Machine Learning Models

Figure 6:
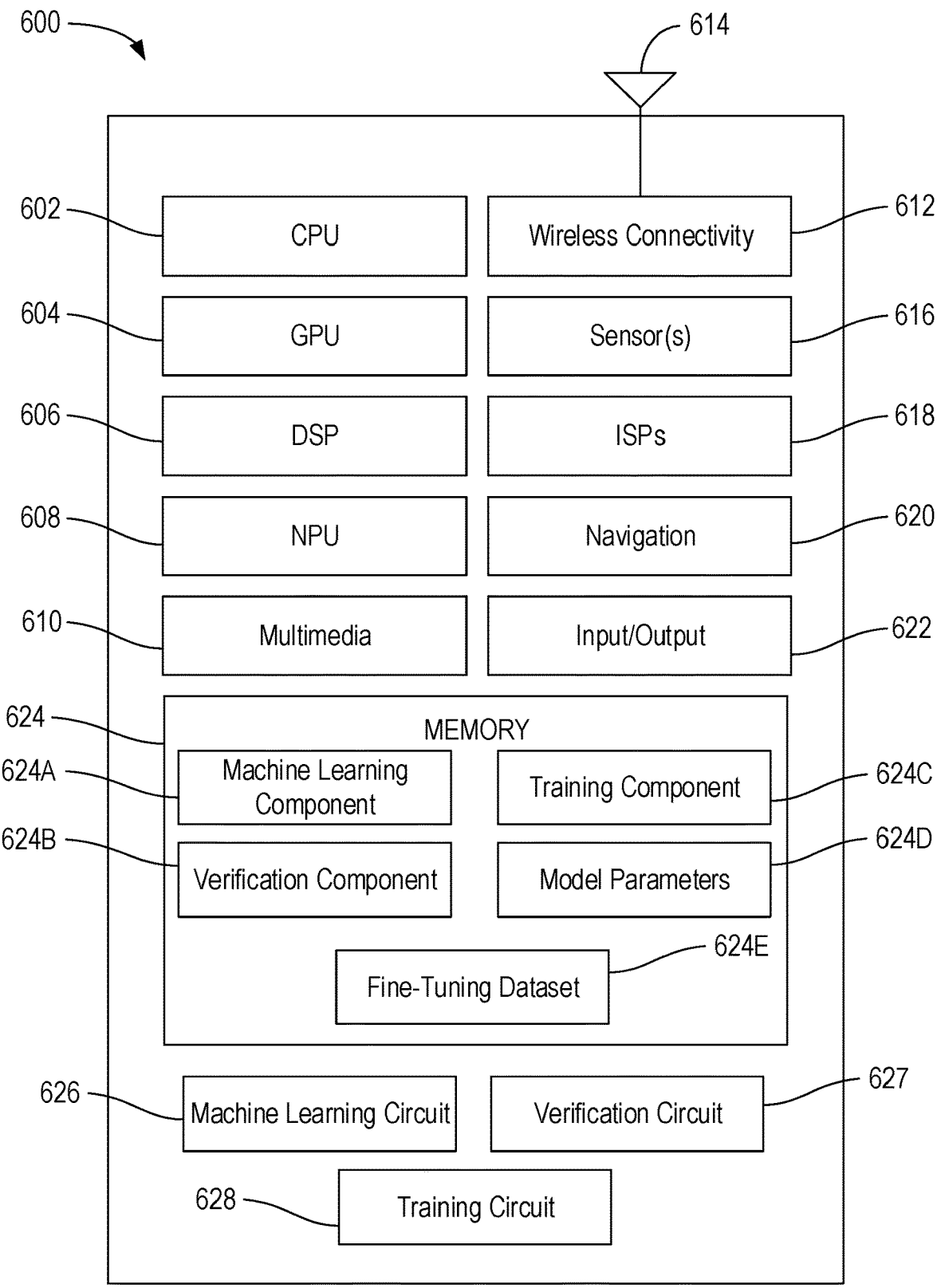
FIG. 6 depicts an example processing system configured to perform various aspects of the present disclosure.

In some aspects, the workflows, techniques, and methods described with reference to FIGS. 1-5 may be implemented on one or more devices or systems. FIG. 6 depicts an example processing system 600 configured to perform various aspects of the present disclosure, including, for example, the techniques and methods described with respect to FIGS. 1-5. In some aspects, the processing system 600 may correspond to a fine-tuning system, such as the fine-tuning system 125 of FIG. 1. Generally, the processing system 600 may correspond to any computing system that updates or fine-tunes machine learning models. Although depicted as a single system for conceptual clarity, in some aspects, as discussed above, the operations described below with respect to the processing system 600 may be distributed across any number of devices or systems.

The processing system 600 includes a central processing unit (CPU) 602, which in some examples may be a multi-core CPU. Instructions executed at the CPU 602 may be loaded, for example, from a program memory associated with the CPU 602 or may be loaded from a memory partition (e.g., a partition of memory 624).

The processing system 600 also includes additional processing components tailored to specific functions, such as a graphics processing unit (GPU) 604, a digital signal processor (DSP) 606, a neural processing unit (NPU) 608, a multimedia component 610 (e.g., a multimedia processing unit), and a wireless connectivity component 612.

An NPU, such as NPU 608, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 608 is a part of one or more of the CPU 602, the GPU 604, and/or the DSP 606.

In some examples, the wireless connectivity component 612 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 612 is further coupled to one or more antennas 614.

The processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS), as well as inertial positioning system components.

The processing system 600 may also include one or more input and/or output devices 622, such as screens, touch-sensitive surfaces (including touch-sensitive displays), physical buttons, speakers, microphones, and the like.

In some examples, one or more of the processors of the processing system 600 may be based on an ARM or RISC-V instruction set.

The processing system 600 also includes the memory 624, which is representative of one or more static and/or dynamic memories, such as a dynamic random access memory, a flash-based static memory, and the like. In this example, the memory 624 includes computer-executable components, which may be executed by one or more of the aforementioned processors of the processing system 600.

In particular, in this example, the memory 624 includes a machine learning component 624A, a verification component 624B, and a training component 624C. The memory 624 further includes model parameters 624D for one or more models or portions thereof (e.g., parameters of a machine learning model, such as the machine learning model 105 of FIG. 1, the revised machine learning model 130 of FIG. 1, and/or the machine learning model 205 of FIG. 2). The memory 624 also includes a fine-tuning dataset 624E (which may correspond to the fine-tuning dataset 235 of FIG. 2). Although not included in the illustrated example, in some aspects the memory 624 may also include other data, such as training data (e.g., the task descriptions 110, unit tests 115, and/or solutions 120 of FIGS. 1 and 2). Though depicted as discrete components for conceptual clarity in FIG. 6, the illustrated components (and others not depicted) may be collectively or individually implemented in various aspects.

The processing system 600 further comprises a machine learning circuit 626, a verification circuit 627, and a training circuit 628. The depicted circuits, and others not depicted, may be configured to perform various aspects of the techniques described herein.

For example, the machine learning component 624A and/or the machine learning circuit 626 may be used to generate synthesized programs using machine learning models, as discussed above. For example, the machine learning component 624A and/or the machine learning circuit 626 may process input text, such as task descriptions (e.g., the task descriptions 110 and/or the unit test(s) 115 of FIGS. 1 and 2) using machine learning models (e.g., the machine learning model 105 of FIG. 1 and/or the machine learning model 205 of FIG. 2) generate synthesized programs (e.g., the program 210 of FIG. 2). In some aspects, the machine learning component 624A and/or the machine learning circuit 626 may similarly generate updated prompts (e.g., by concatenating task descriptions (such as the task description 110 of FIG. 1), incorrect programs (e.g., the program 210 of FIG. 2), and/or feedback (e.g., the feedback 225 of FIG. 2). The machine learning component 624A and/or the machine learning circuit 626 may then use these updated prompts to generate revised models, as discussed above.

The verification component 624B and/or the verification circuit 627 (which may correspond to the verification component 215 of FIG. 2) may be used to verify whether generated programs (including revised or repaired programs) satisfy programming tasks, as discussed above. For example, the verification component 624B and/or the verification circuit 627 may determine whether generated programs result in any compilation errors when compiled or interpreted, and/or any runtime errors when executed. As another example, the verification component 624B and/or the verification circuit 627 may determine whether the generated program operates accurately or correctly, such as whether the program generates a correct output based on a given input (e.g., using unit tests).

The training component 624C and/or the training circuit 628 (which may correspond to the training component 220 of FIG. 2) may be used to generate fine-tuning data (e.g., the fine-tuning dataset 624E) and use this fine-tuning data to update parameters of machine learning models, as discussed above. For example, the training component 624C and/or the training circuit 628 may generate exemplars including generated program code (when the model generates a program that satisfies the input programming task) and/or ground-truth code (when the model fails to generate a program that satisfies the task), and may use these exemplars to refine the model in order to improve its accuracy.

Though depicted as separate components and circuits for clarity in FIG. 6, the machine learning circuit 626, the verification circuit 627, and the training circuit 628 may collectively or individually be implemented in other processing devices of the processing system 600, such as within the CPU 602, the GPU 604, the DSP 606, the NPU 608, and the like.

Generally, the processing system 600 and/or components thereof may be configured to perform the methods described herein.

Notably, in other aspects, elements of the processing system 600 may be omitted, such as where the processing system 600 is a server computer or the like. For example, the multimedia component 610, the wireless connectivity component 612, the sensor processing units 616, the ISPs 618, and/or the navigation processor 620 may be omitted in other aspects. Further, aspects of the processing system 600 may be distributed between multiple devices.

Example Clauses

Implementation examples are described in the following numbered clauses:

Clause 1: A method, comprising: accessing a second input indicating a second programming task; generating a second generated program based on processing the second input using the trained machine learning model; in response to determining that the second generated program failed to satisfy the second programming task: generating second feedback based on the determination that the second generated program failed to satisfy the second programming task; and generating a second revised program based on processing the second feedback using the trained machine learning model; and in response to determining that the second revised program failed to satisfy the second programming task, updating one or more parameters of the trained machine learning model based further on a ground-truth program for the second programming task.

Clause 2: A method according to Clause 1, further comprising: accessing a second input indicating a second programming task; generating a second generated program based on processing the second input using the trained machine learning model; and in response to determining that the second generated program satisfied the second programming task, updating one or more parameters of the trained machine learning model based further on the second generated program.

Clause 3: A method according to any of Clauses 1-2, further comprising: accessing a second input indicating a second programming task; generating a second generated program based on processing the second input using the trained machine learning model; in response to determining that the second generated program failed to satisfy the second programming task: generating second feedback based on the determination that the second generated program failed to satisfy the second programming task; and generating a second revised program based on processing the second feedback using the trained machine learning model; and in response to determining that the second revised program failed to satisfy the second programming task, updating one or more parameters of the trained machine learning model based further on a ground-truth program for the second programming task.

Clause 4: A method according to any of Clauses 1-3, wherein the first input comprises a natural language description of the first programming task.

Clause 5: A method according to Clause 4, wherein the first input further comprises a unit test to verify accuracy of programs with respect to the first programming task.

Clause 6: A method according to any of Clauses 1-5, wherein determining that the first generated program failed to satisfy the first programming task comprises at least one of: (i) determining that the first generated program caused one or more compilation errors, (ii) determining that the first generated program caused one or more runtime errors, or (iii) determining that the first generated program failed to accurately process one or more unit tests associated with the first programming task.

Clause 7: A method according to any of Clauses 1-6, wherein the first feedback comprises an indication that the first generated program is incorrect.

Clause 8: A method according to Clause 7, wherein the first feedback further comprises one or more error explanations for the first generated program.

Clause 9: A method according to any of Clauses 1-8, wherein generating the first revised program comprises: generating a concatenated input based on concatenating the first input, the first generated program, and the first feedback; and processing the concatenated input using the trained machine learning model.

Clause 10: A processing system comprising: a memory comprising computer-executable instructions; and one or more processors configured to execute the computer-executable instructions and cause the processing system to perform a method in accordance with any of Clauses 1-9.

Clause 11: A processing system comprising means for performing a method in accordance with any of Clauses 1-9.

Clause 12: A non-transitory computer-readable medium comprising computer-executable instructions that, when executed by one or more processors of a processing system, cause the processing system to perform a method in accordance with any of Clauses 1-9.

Clause 13: A non-transitory computer-readable medium encoding logic that, when executed by a processing system, causes the processing system to perform a method in accordance with any of Clauses 1-9.

Clause 14: An apparatus comprising logic circuitry configured to perform a method in accordance with any of Clauses 1-9.

Clause 15: A computer program product embodied on a computer-readable storage medium comprising code for performing a method in accordance with any of Clauses 1-9.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:
one or more memories comprising processor-executable instructions; and
one or more processors configured to execute the processor-executable instructions and cause the processing system to:
access a first input indicating a first programming task;
generate a first generated program, wherein, to generate the first generated program, the one or more processors are configured to execute the processor-executable instructions to cause the processing system to process the first input using a trained machine learning model;
determine that the first generated program failed to satisfy the first programming task;
generate first feedback based on the determination that the first generated program failed to satisfy the first programming task;
generate a first revised program, wherein, to generate the first revised program, the one or more processors are configured to execute the processor-executable instructions to cause the processing system to process the first feedback using the trained machine learning model, and wherein to process the first feedback, the one or more processors are configured to execute the processor-executable instructions to cause the processing system to provide the first feedback as at least a portion of a prompt to the trained machine learning model;
determine that the first revised program satisfied the first programming task; and
update one or more parameters of the trained machine learning model based on the first revised program in response to the determination that the first revised program satisfied the first programming task.

2. The processing system of claim 1, wherein the one or more processors are configured to further execute the processor-executable instructions to cause the processing system to:
access a second input indicating a second programming task;
generate a second generated program, wherein, to generate the second generated program, the one or more processors are configured to execute the processor-executable instructions to cause the processing system to process the second input using the trained machine learning model;
determine that the second generated program satisfied the second programming task; and
update one or more parameters of the trained machine learning model based further on the second generated program in response to the determination that the second generated program satisfied the second programming task.

3. The processing system of claim 1, wherein the one or more processors are configured to further execute the processor-executable instructions to cause the processing system to:
access a second input indicating a second programming task;
generate a second generated program, wherein, to generate the second generated program, the one or more processors are configured to execute the processor-executable instructions to cause the processing system to process the second input using the trained machine learning model;
determine that the second generated program failed to satisfy the second programming task;
generate second feedback based on the determination that the second generated program failed to satisfy the second programming task;
generate a second revised program, wherein, to generate the second revised program, the one or more processors are configured to execute the processor-executable instructions to cause the processing system to process the second feedback using the trained machine learning model;
determine that the second revised program failed to satisfy the second programming task; and
update one or more parameters of the trained machine learning model based further on a ground-truth program for the second programming task in response to the determination that the second revised program failed to satisfy the second programming task.

4. The processing system of claim 1, wherein the first input comprises a natural language description of the first programming task.

5. The processing system of claim 4, wherein the first input further comprises a unit test to verify accuracy of programs with respect to the first programming task.

6. The processing system of claim 1, wherein, to determine that the first generated program failed to satisfy the first programming task, the one or more processors are configured to execute the processor-executable instructions to cause the processing system to:
(i) determine that the first generated program caused one or more compilation errors,
(ii) determine that the first generated program caused one or more runtime errors, or
(iii) determine that the first generated program failed to accurately process one or more unit tests associated with the first programming task.

7. The processing system of claim 1, wherein the first feedback comprises an indication that the first generated program is incorrect.

8. The processing system of claim 7, wherein the first feedback further comprises one or more error explanations for the first generated program.

9. The processing system of claim 1, wherein, to generate the first revised program, the one or more processors are configured to execute the processor-executable instructions to cause the processing system to:
  generate a concatenated input, wherein, to generate the concatenated input, the one or more processors are configured to execute the processor-executable instructions to cause the processing system to concatenate the first input, the first generated program, and the first feedback; and
  process the concatenated input using the trained machine learning model.

10. A processor-implemented method, comprising:
  accessing a first input indicating a first programming task;
  generating a first generated program based on processing the first input using a trained machine learning model;
  in response to determining that the first generated program failed to satisfy the first programming task:
    generating first feedback based on the determination that the first generated program failed to satisfy the first programming task; and
    generating a first revised program based on processing the first feedback using the trained machine learning model, wherein processing the first feedback comprises providing the first feedback as at least a portion of a prompt to the trained machine learning model; and
  in response to determining that the first revised program satisfied the first programming task, updating one or more parameters of the trained machine learning model based on the first revised program.

11. The processor-implemented method of claim 10, further comprising:
  accessing a second input indicating a second programming task;
  generating a second generated program based on processing the second input using the trained machine learning model; and
  in response to determining that the second generated program satisfied the second programming task, updating one or more parameters of the trained machine learning model based further on the second generated program.

12. The processor-implemented method of claim 10, further comprising:
  accessing a second input indicating a second programming task;
  generating a second generated program based on processing the second input using the trained machine learning model;
  in response to determining that the second generated program failed to satisfy the second programming task:
    generating second feedback based on the determination that the second generated program failed to satisfy the second programming task; and
    generating a second revised program based on processing the second feedback using the trained machine learning model; and
  in response to determining that the second revised program failed to satisfy the second programming task, updating one or more parameters of the trained machine learning model based further on a ground-truth program for the second programming task.

13. The processor-implemented method of claim 10, wherein the first input comprises a natural language description of the first programming task.

14. The processor-implemented method of claim 13, wherein the first input further comprises a unit test to verify accuracy of programs with respect to the first programming task.

15. The processor-implemented method of claim 10, wherein determining that the first generated program failed to satisfy the first programming task comprises at least one of:
  (i) determining that the first generated program caused one or more compilation errors,
  (ii) determining that the first generated program caused one or more runtime errors, or
  (iii) determining that the first generated program failed to accurately process one or more unit tests associated with the first programming task.

16. The processor-implemented method of claim 10, wherein the first feedback comprises an indication that the first generated program is incorrect.

17. The processor-implemented method of claim 16, wherein the first feedback further comprises one or more error explanations for the first generated program.

18. The processor-implemented method of claim 10, wherein generating the first revised program comprises:
  generating a concatenated input based on concatenating the first input, the first generated program, and the first feedback; and
  processing the concatenated input using the trained machine learning model.

19. One or more non-transitory computer-readable media comprising computer-executable instructions that, when executed by one or more processors of one or more processing systems, cause the one or more processing systems to:
  access a first input indicating a first programming task;
  generate a first generated program, wherein, to generate the first generated program, the computer-executable instructions, when executed by the one or more processors, cause the one or more processing systems to process the first input using a trained machine learning model;
  determine that the first generated program failed to satisfy the first programming task:
  generate first feedback based on the determination that the first generated program failed to satisfy the first programming task;
  generate a first revised program, wherein, to generate the first revised program, the computer-executable instructions, when executed by the one or more processors, cause the one or more processing systems to process the first feedback using the trained machine learning model, and wherein to process the first feedback, the computer-executable instructions, when executed by the one or more processors, cause the one or more processing systems to provide the first feedback as at least a portion of a prompt to the trained machine learning model;
  determine that the first revised program satisfied the first programming task; and
  update one or more parameters of the trained machine learning model based on the first revised program in response to the determination that the first revised program satisfied the first programming task.

20. The one or more non-transitory computer-readable media of claim 19, wherein the computer-executable instructions, when executed by the one or more processors, further cause the one or more processing systems to:

access a second input indicating a second programming task;
generate a second generated program, wherein, to generate the second generated program, the computer-executable instructions, when executed by the one or more processors, cause the one or more processing systems to process the second input using the trained machine learning model;
determine that the second generated program satisfied the second programming task; and
update one or more parameters of the trained machine learning model based further on the second generated program in response to the determination that the second generated program satisfied the second programming task.

21. The one or more non-transitory computer-readable media of claim 19, wherein the computer-executable instructions, when executed by the one or more processors, further cause the one or more processing systems to:
access a second input indicating a second programming task;
generate a second generated program, wherein, to generate the second generated program, the computer-executable instructions, when executed by the one or more processors, cause the one or more processing systems to process the second input using the trained machine learning model;
determine that the second generated program failed to satisfy the second programming task;
generate second feedback based on the determination that the second generated program failed to satisfy the second programming task; and
generate a second revised program, wherein, to generate the second revised program, the computer-executable instructions, when executed by the one or more processors, cause the one or more processing systems to process the second feedback using the trained machine learning model;
determine that the second revised program failed to satisfy the second programming task; and
update one or more parameters of the trained machine learning model based further on a ground-truth program for the second programming task in response to the determination that the second revised program failed to satisfy the second programming task.

22. The one or more non-transitory computer-readable media of claim 19, wherein the first input comprises a natural language description of the first programming task.

23. The one or more non-transitory computer-readable media of claim 22, wherein the first input further comprises a unit test to verify accuracy of programs with respect to the first programming task.

24. The one or more non-transitory computer-readable media of claim 19, wherein, to determine that the first generated program failed to satisfy the first programming task, the computer-executable instructions, when executed by the one or more processors, cause the one or more processing systems to:
(i) determine that the first generated program caused one or more compilation errors,
(ii) determine that the first generated program caused one or more runtime errors, or
(iii) determine that the first generated program failed to accurately process one or more unit tests associated with the first programming task.

25. The one or more non-transitory computer-readable media of claim 19, wherein the first feedback comprises an indication that the first generated program is incorrect.

26. The one or more non-transitory computer-readable media of claim 25, wherein the first feedback further comprises one or more error explanations for the first generated program.

27. The one or more non-transitory computer-readable media of claim 19, wherein, to generate the first revised program comprises, the computer-executable instructions, when executed by the one or more processors, cause the one or more processing systems to:
generate a concatenated input, wherein, to generate the concatenated input, the computer-executable instructions, when executed by the one or more processors, cause the one or more processing systems to concatenate the first input, the first generated program, and the first feedback; and
process the concatenated input using the trained machine learning model.

28. A processing system, comprising:
means for accessing a first input indicating a first programming task;
means for generating a first generated program based on processing the first input using a trained machine learning model;
means for determining that the first generated program failed to satisfy the first programming task;
means for generating first feedback based on the determination that the first generated program failed to satisfy the first programming task; and
means for generating a first revised program based on processing the first feedback using the trained machine learning model, wherein processing the first feedback comprises providing the first feedback as at least a portion of a prompt to the trained machine learning model;
means for determining that the first revised program satisfied the first programming task; and
means for updating one or more parameters of the trained machine learning model based on the first revised program in response to the determination that the first revised program satisfied the first programming task.

29. The processing system of claim 28, further comprising:
means for accessing a second input indicating a second programming task;
means for generating a second generated program based on processing the second input using the trained machine learning model;
means for determining that the second generated program satisfied the second programming task; and
means for updating one or more parameters of the trained machine learning model based further on the second generated program in response to the determination that the second generated program satisfied the second programming task.

30. The processing system of claim 28, further comprising:
means for accessing a second input indicating a second programming task;
means for generating a second generated program based on processing the second input using the trained machine learning model;
means for determining that the second generated program failed to satisfy the second programming task;

means for generating second feedback based on the determination that the second generated program failed to satisfy the second programming task;

means for generating a second revised program based on processing the second feedback using the trained machine learning model;

means for determining that the second revised program failed to satisfy the second programming task; and means for updating one or more parameters of the trained machine learning model based further on a ground-truth program for the second programming task in response to the determination that the second revised program failed to satisfy the second programming task.

\* \* \* \* \*